Nov. 13, 1962  A. G. HUPP  3,063,609
APPARATUS FOR BREAKING GLASS STRANDS
Filed June 17, 1958  2 Sheets-Sheet 1
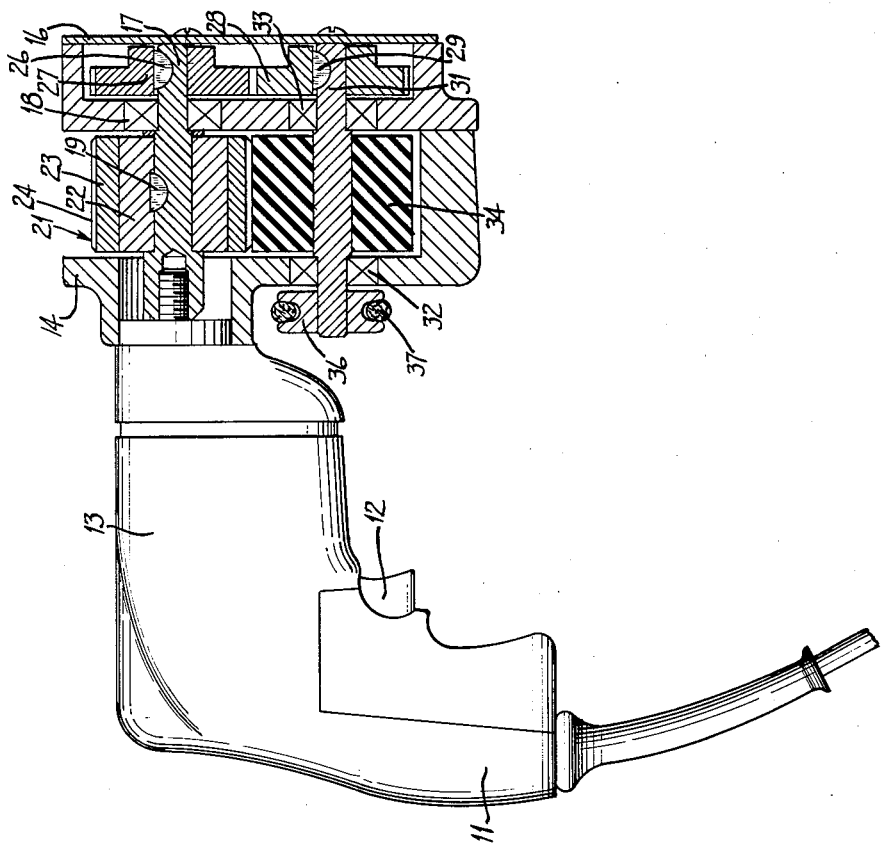
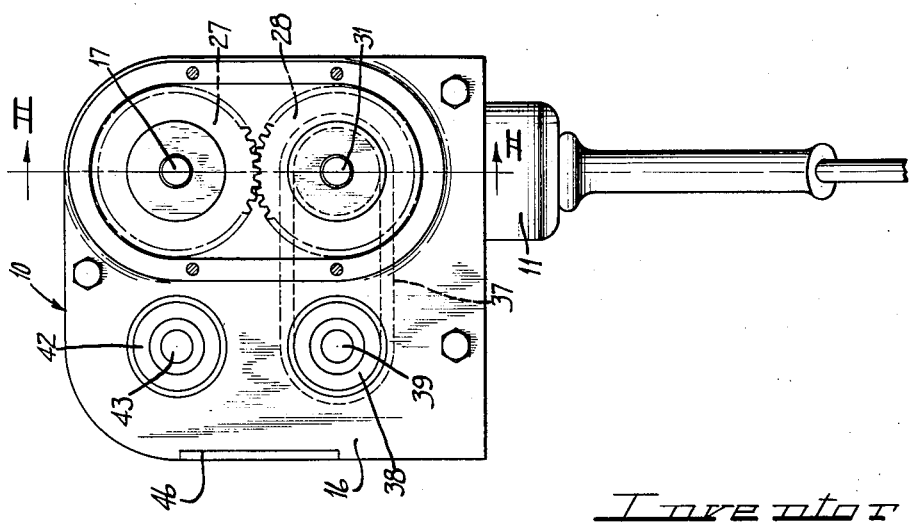
Inventor
Arleigh G. Hupp

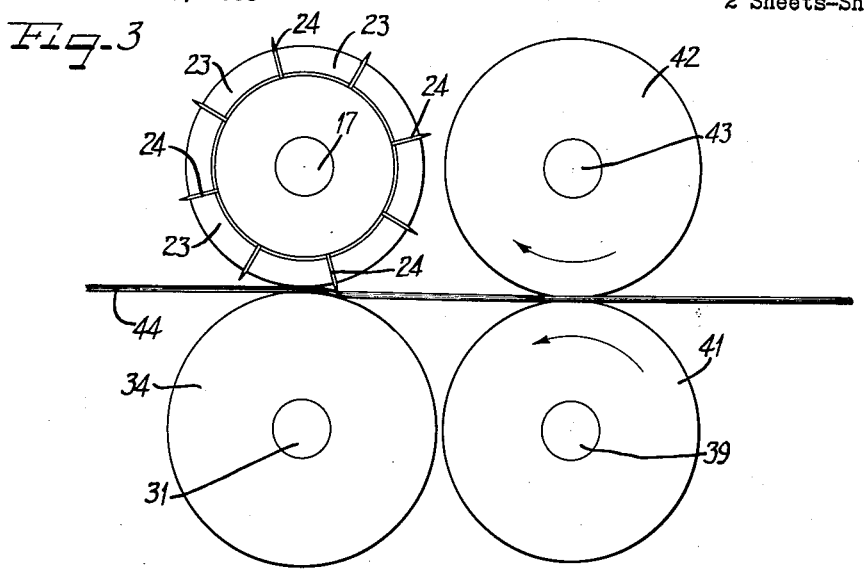
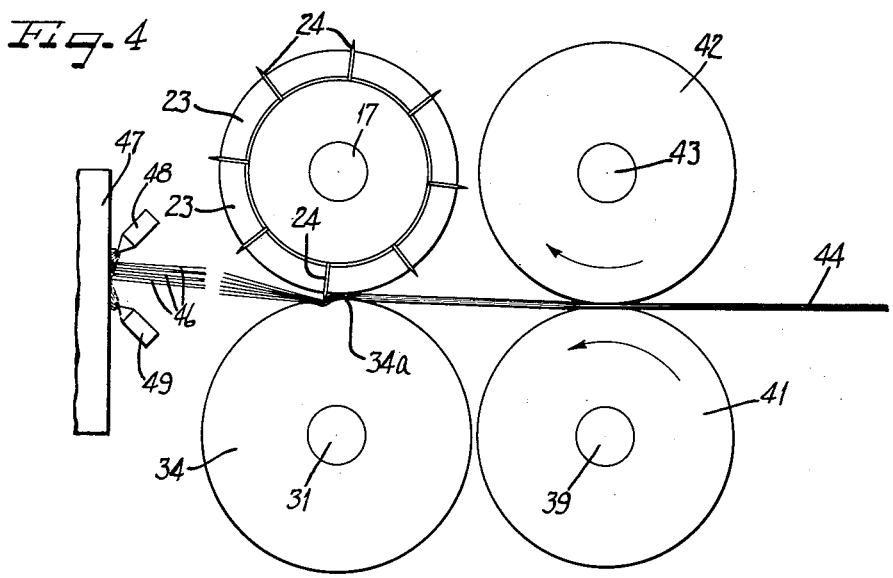

United States Patent Office 3,063,609
Patented Nov. 13, 1962

3,063,609
APPARATUS FOR BREAKING GLASS STRANDS
Arleigh G. Hupp, % Hupp Engineering Associates,
P.O. Box 3290, N. Highway 301, Sarasota, Fla.
Filed June 17, 1958, Ser. No. 742,634
6 Claims. (Cl. 225—103)

The present invention is concerned with a method for providing a continuous stream of cut glass strands of predetermined lengths. The invention is also concerned with an improved apparatus for carrying out this method.

The method and apparatus of the invention have particular applicability to the manufacture of resinous materials reinforced with discrete glass fiber strands. Such products are becoming more important commercially in view of their excellent strength characteristics and the ease in which the material can be molded or otherwise formed by conventional resin shaping processes.

The method and apparatus of the present invention lend themselves particularly well to shaping processes involving spraying a liquid resin onto the surface of a mold, followed by the application of the cut glass fiber strands and then followed by the reapplication of additional amounts of resin. For example, the initial resin coating may be applied by two spray guns, one spraying a liquid resin containing a promoter, and the other containing a liquid resin containing a catalyst. While the resin coating is still wet, the cut glass fibers are applied, preferably with the improved portable glass breaker of the present invention. Next, the additional amounts of resin are put on by the spray heads and the entire assembly may be rolled to compact or densify the applied coating. Finally, the coating is set into rigid form by the evaporation of solvents, heat, pressure, or other means normally employed to harden the resin involved.

Some difficulty has been experienced in securing a uniform stream of glass fibers for application in the manner described previously. Machines which have heretofore been employed for the purpose are frequently cumbersome and therefore difficult to maneuver into proper position for the application of the fibers. Furthermore, in most instances, it was impossible to start and stop the glass breaking mechanism at will since the glass strands had to be threaded through the machine anew every time the cutting mechanism was stopped.

With the foregoing in mind, an object of the present invention is to provide an improved apparatus for delivering a continuous stream of cut glass fibers.

Another object of the invention is to provide an apparatus which continuously delivers a stream of broken glass fibers of desired length and can be turned on and off at will.

Still another object of the invention is to provide a completely portable, hand held glass breaking apparatus embodying the features previously described.

A further object of the invention is to provide a method for more efficiently breaking glass fibers into desired lengths.

Other objects and features of the present invention will be apparent to those skilled in the art from the following description of the attached sheets of drawings which illustrate a preferred embodiment of a glass breaking assembly.

In the drawings:

FIGURE 1 is a front view in elevation of the glass breaking assembly;

FIGURE 2 is a cross-sectional view taken substantially along line II—II of FIGURE 1;

FIGURE 3 is a somewhat schematic view illustrating the condition of the glass strands just prior to a given breaking operation; and FIGURE 4 is a view similar to FIGURE 3 but illustrating the condition of the strands at about the time of the breaking operation, and also illustrating the manner in which the broken strands are applied to a surface.

As shown in the drawings:

In FIGURE 1, reference numeral 10 indicates generally a gun type portable glass breaker assembly including a handle portion 11 equipped with a trigger switch 12 for energizing a motor (not shown) contained within a conventional power tool motor housing 13.

The glass breaker assembly itself is detachably secured to the housing 13 and may consist of a frame 14 to which is secured a front facing plate 16 to provide a casing for the rotary elements in the glass breaking assembly.

A drive shaft 17 extending from motor assembly is mounted for rotation within the casing by a bearing 18. Secured to the drive shaft 17, as by means of a key 19, is a breaker roll assembly generally designated at numeral 21 in the drawings and consisting of a hub 22, a plurality of arcuate segments 23 detachably secured to the hub 22, and a plurality of radially extending breaker blades 24 positioned between the segments 23 in peripherally spaced relation about the breaker roll assembly. The peripheral spacing of the blades 24, determines the length to which the glass fibers will be broken. In the particular embodiment shown in the drawing, eight such blades are positioned about the periphery of the breaker roll 21 in equally spaced relation, but it will be recognized that the number of blades and their position can be varied at will depending upon the requirements.

Also secured to the shaft 17 as by means of a key 26 is a gear 27 which meshes with a gear 28 secured by means of a key 29 to a shaft 31. A pair of bearings 32 and 33 mount the shaft 31 for rotation in the casing.

The shaft 31 also supports a resiliently deformable roll 34 which provides a resilient backing for the breaking edges of the blades 24. While many different types of materials can be employed for the roll 34, I prefer to use a synthetic rubber material such as "neoprene" having a durometer reading of about thirty-five.

Secured to the inner end of the shaft 31 is a pulley 36. A belt 37 engages the pulley 36 to drive a pulley 38 mounted on a shaft 39. A feed roller 41 is secured to the shaft 39 and cooperates with an idler roller 42 mounted on a shaft 43 for feeding the glass strands into the breaking area.

As the starting material, I prefer to use a glass fiber roving consisting of continuous filaments of glass loosely held together in a rope-like structure.

The roving 44 enters the glass breaker assembly through an inlet 46 whereupon it passes into the nip between the driven feed roll 41 and the superimposed idler roll 42.

As the roving 44 is fed between the breaker roll 21 and the resiliently deformable roll 34, it is engaged by a blade 24 which serves to tension the roving for the succeeding breaking operation.

The breaker roll 21, the resiliently deformable roll 34 and the feed roll 41 are driven at the same angular velocity. However, the effective diameter of the breaker roll 21, measured from the outer ends of two diametrically opposed blades 24, is slightly smaller than the normal effective or relaxed diameter of the resiliently deformable roll 34. Furthermore, the roll 34 is positioned sufficiently close to the path of the blades 24 so that during rotation of the breaker roll 21 the blades 24 are partly embedded in the resiliently deformable surface of the roll 34.

In the condition of the assembly shown in FIGURE 3, a blade 24 is beginning to press a roving 44 into the surface of the roll 34. The strands in the glass roving are therefore under tension from this time on until they are broken by the sharp angular pressure applied by the blades 24. The severance which occurs is not a simple shear across the strand but is primarily due to the flexing of the strand into and out of engagement with the deformable periphery of the roll 34.

From FIGURE 4 it will be noted that at the time the breaking action occurs, the surface of the roll 34 is deformed as indicated by the protuberance 34a, whereupon pressure is applied to the portion of the roving immediately behind the breaking area and so the remainder of the strands are held in tension until the next succeeding blade 24 is in position to break an additional length of glass strands. With this arrangement, there is a continuous tensioning force being applied to the roving 44 before, during, and after the strands of the roving are broken into the desired discrete lengths. Accordingly, the glass breaking mechanism can be stopped at any time without the need for re-threading the strands through the roll assemblies.

To secure the proper tensioning, the diameter of the breaker roll, measured at the tips of the blades 24, is substantially the same as the diameter of the depressed surface periphery of roll 34, and, in turn, substantially the same as the diameters of the rolls 41 and 42. Thus when roll 34 is driven at the same speed as roll 41, the tips of the cutter blades 24 are running at the same lineal speed as the lineal speed at the periphery of rolls 41 and 42. However, the increase in diameter of the roll 34 occasioned by the protuberance 34a causes a tensioning of the glass roving from the rolls 41 and 42. Tensioning can also be provided by driving rolls 41 and 42 at a slightly lesser speed than the breaker roll and roll 34.

The manner of applying the broken strands is also illustrated somewhat schematically in FIGURE 4 of the drawings. The individual strands 46 broken by the glass breaker assembly are propelled toward an article such as a mold 47. The surface of the mold may be pre-coated for the reception of the strands by a pair of mobile spray guns 48 and 49 which direct a liquid promoted and catalyzed resin onto that surface. Then, after the strands 46 have become adhered to the coated surface, additional amounts of the resin may be applied over the strands. Finally, the strand-filled resin is set on the surface by the action of heat, pressure or other means for completing the setting reaction.

While the foregoing description has been concerned essentially with glass strands, it should be recognized that the term "glass" as used herein should also apply to other types of filamentary materials having physical properties comparable to those possessed by glass strands.

It will be evident that various modifications can be made to the described embodiments without departing from the scope of the present invention.

I claim as my invention:

1. A glass breaker assembly comprising a frame, a breaker roll mounted for rotation on said frame, peripherally spaced blades secured to said breaker roll, a resilient roll secured to said frame and arranged to be deformed substantially by engagement of one of said blades with its periphery, means interconnecting said breaker roll and said resilient roll to drive one from the other, a feed roller mounted on said frame in spaced relation to said resilient roll, an idler roller associated with said feed roller and arranged to be driven by rotation of said feed roller, said feed roller and said idler roller cooperating to positively feed glass strands to said breaker roll whereby glass strands passing from said feed roller to the nip between said resilient roll and said blades are tensioned by deformation of said resilient roll and broken by the flexing of said strands between said blades and said resilient roll, the axis of the rolls being parallel with the axis of the rollers, the rolls and rollers being mounted within a housing having a housing inlet and outlet, said feed and idler rollers also providing means for maintaining the glass strand threaded therebetween when the rolls and rollers are idle to prevent the glass strand from dropping free of said housing.

2. A glass breaker assembly comprising a frame, a breaker roll mounted for rotation on said frame, peripherally spaced blades secured to said breaker roll, a resilient roll arranged to be deformed substantially by engagement of said blades with the periphery of said resilient roll, means interconnecting said resilient roll and said breaker roll to drive said rolls at the same angular velocity, a feed roll mounted on said frame in closely spaced relation to said resilient roll, an idler roll mounted on said frame in closely spaced relation to said feed roll and arranged to engage a glass strand between its periphery and the periphery of said feed roll to positively direct said strand between said blade and said resilient roll, means for driving said feed roll at the same surface speed as said resilient roll, said feed roll having a smaller diameter than the deformed diameter of said resilient roll, whereby a glass strand is tensioned by delivery between said blade and said resilient roll and broken by flexing therebetween.

3. A portable gun type glass breaker assembly comprising a gun type handle having a trigger, the handle bearing a motor housing for carrying a motor to be operated by the trigger, a frame mounted on said motor housing, a breaker roll mounted for rotation on said frame, peripherally spaced blades secured to said breaker roll, a resilient roll arranged to be deformed substantially by engagement of said blades with the periphery of said resilient roll, means interconnecting said resilient roll and said breaker roll to drive said rolls at the same angular velocity, a feed roll mounted on said frame in spaced relation to said resilient roll, an idler roll in spaced relation to said feed roll and arranged to engage a glass strand between its periphery and the periphery of said feed roll to positively direct said strand between said blade and said resilient roll, means for driving said feed roll at the same angular velocity as said resilient roll, and feed roll having a smaller diameter than the deformed diameter of said resilient roll, whereby a glass strand is tensioned by delivery between said blade and said resilient roll and broken by flexing therebetween, said feed roll and said idler roll providing means for maintaining the glass strand threaded between the feed roll and the idler roll when the rolls are idle to prevent the glass strand from dropping free of the glass breaker assembly.

4. In a glass breaker assembly, a housing with a glass strand inlet and an outlet spaced therefrom and said housing having mounted therebetween said inlet and outlet a driven breaker roll, a plurality of peripherally spaced blades extending radially from said breaker roll, and a resilient roll mounted opposite the breaker roll and its blades, means for driving said resilient roll at substantially the same angular velocity as said breaker roll, a pair of guide rolls mounted at one side of said resilient roll for guiding glass strands in a nip between the breaker and resilient rolls, said pairs of rolls being juxtaposed with the glass strands tensioned between the nips of the pairs of rolls and in alignment with the housing inlet and outlet said blades having tip ends of a diameter to provide means for upsetting said resilient roll increasing its effective diameter to stress the glass strands between an upset roll area and the guide rolls to successively bend portions of glass strands, said tip ends also providing means for cross-bending and breaking the thus tensioned strands on the downstream side of the upset roll area causing the tensioned broken strands to fly apart in a stream from between said breaker roll and said resilient roll.

5. A portable gun type glass breaker assembly comprising a gun type handle having a trigger, the handle bearing a motor housing which carries a motor including a drive shaft operated by the trigger, a frame mounted on said motor housing, a breaker roll mounted for rotation on said frame, peripherally spaced blades secured to said breaker roll, a resilient anvil roll arranged to be deformed substantially by engagement of said blades with the periphery of said resilient anvil roll, means interconnecting said resilient anvil roll and said breaker roll with said drive shaft to drive said rolls at the same surface speed, a feed roll mounted on said frame in spaced relation to said resilient anvil roll, an idler roll opposite said feed roll and arranged to engage a glass strand between its periphery and the periphery of said feed roll to positively direct the strand between said blades and said resilient anvil roll, and to tension the strand, means operatively connected to said drive shaft for driving said feed roll, said feed roll having a smaller diameter than the deformed diameter of said resilient anvil roll and with the previously tensioned glass strand being broken by flexing between the blade and said resilient anvil roll to cause the filaments of the tensioned strand to fly apart in random fashion, said feed roll and said idler roll providing means for maintaining the glass strand threaded between the feed roll and the idler roll when the rolls are idle to prevent the glass strand from dropping free of the glass breaker assembly.

6. The breaker assembly of claim 5 further characterized by the housing having an inlet for receiving a glass strand and by the housing having an outlet through which broken random dispersed filaments can be discharged, the inlet and outlet of the housing being longitudinally aligned with the nips between the rolls and with the path of movement of the strand between the rolls.

References Cited in the file of this patent
UNITED STATES PATENTS

| | | |
|---|---|---|
| 2,049,535 | Benner et al. | Aug. 4, 1936 |
| 2,252,733 | Sherman et al. | Aug. 19, 1941 |
| 2,639,772 | Sandberg et al. | May 26, 1953 |
| 2,704,725 | Berglund | Mar. 22, 1955 |
| 2,729,028 | Slayter et al. | Jan. 3, 1956 |
| 2,774,188 | Jordon | Dec. 18, 1956 |
| 2,839,871 | Austin | June 24, 1958 |

FOREIGN PATENTS

| | | |
|---|---|---|
| 734,189 | Great Britain | July 27, 1955 |